(12) United States Patent
Rey

(10) Patent No.: US 6,402,800 B1
(45) Date of Patent: Jun. 11, 2002

(54) FILTERING CARTRIDGE, IN PARTICULAR FOR INTERNAL COMBUSTION ENGINE

(75) Inventor: Charles Rey, La Ferte Bernard (FR)

(73) Assignee: Filtrauto (FR)

( * ) Notice: Subject to any disclaimer, the term of this patent is extended or adjusted under 35 U.S.C. 154(b) by 0 days.

(21) Appl. No.: 09/622,554
(22) PCT Filed: Feb. 12, 1999
(86) PCT No.: PCT/FR99/00317
§ 371 (c)(1),
(2), (4) Date: Oct. 19, 2000
(87) PCT Pub. No.: WO99/42199
PCT Pub. Date: Aug. 26, 1999

(30) Foreign Application Priority Data

Feb. 17, 1998 (FR) .............................................. 98 01901

(51) Int. Cl.⁷ ............................................... B01D 46/10
(52) U.S. Cl. ........................ 55/498; 55/385.3; 55/500; 55/521; 210/493.1; 210/493.5; 210/494.1
(58) Field of Search ............................... 55/385.3, 498, 55/500, 521; 210/493.1, 493.5, 494.1, 493.3

(56) References Cited

U.S. PATENT DOCUMENTS 2,801,009 A    7/1957  Bowers
3,716,436 A *  2/1973  Pall et al. ...................... 55/521
4,268,290 A *  5/1981  Barrington .................... 55/521
4,732,678 A *  3/1988  Humbert, Jr. ................. 55/521
5,066,400 A * 11/1991  Rocklitz et al. .............. 55/521
5,089,202 A *  2/1992  Lippold ........................ 55/521
5,120,331 A *  6/1992  Landy .......................... 55/521
5,744,036 A *  4/1998  Choi ............................ 55/521
5,888,262 A *  3/1999  Kahler ......................... 55/521
6,113,784 A *  9/2000  Stoyell et al. ................ 55/521
6,165,241 A * 12/2000  Choi ............................ 55/521
6,165,242 A * 12/2000  Choi ............................ 55/521

FOREIGN PATENT DOCUMENTS

| DE | 4312076 | 11/1993 |
| GB | 1148942 | 4/1969 |
| GB | 1400147 | 7/1975 |
| WO | WO 92/05860 | 4/1992 |

* cited by examiner

Primary Examiner—David A. Simmons
Assistant Examiner—Minh-Chau T. Pham
(74) Attorney, Agent, or Firm—Piper Rudnick

(57) ABSTRACT

A filter cartridge has a tubular filter element made from a porous, flexible sheet forming an annular succession of pleats having axial ridges, in the form of vanes all curved in a same circumferential direction, each vane comprising an upper face and a lower face. The lower face and upper face of each vane has lines of least resistance forming hinges, enabling the curvature of the vanes to be better controlled.

12 Claims, 2 Drawing Sheets

FILTERING CARTRIDGE, IN PARTICULAR FOR INTERNAL COMBUSTION ENGINE

FIELD OF THE INVENTION

The present invention relates to filter cartridges, in particular for internal combustion engines.

More specifically, the invention relates to a filter cartridge comprising a tubular filter element extending along a central axis between two longitudinal ends, said filter element having an external cylindrical surface and an internal cylindrical surface forming a central passage for fluid, said filter element being made from a porous flexible sheet forming a succession of pleats with axial edges, these pleats forming vanes all curved in a same angular direction, each vane comprising first and second portions each having a concave face and a convex face, each of said first and second portions of each vane extending between an inner end close to the internal cylindrical surface of the filter cartridge and an outer end close to the external cylindrical surface oft he filter cartridge, the concave face of the first portion of each van communicating with the central passage and the convex face of the second portion of each vane communicating with said central passage, the first and second portions of each vane being joined at their outer ends, the second portion of each vane being joined to the first portion of an adjacent vane at their inner ends, and the porous sheet having separator elements which hold the different first and second portions of the vanes apart from one another and impart stiffness to said porous sheet.

BACKGROUND OF THE INVENTION

Document U.S. Pat. No. 2,801,009 describes an example of such a filter cartridge, the disadvantage of which is that it is relatively complex and delicate to manufacture on an industrial scale, particularly since it is difficult to control the exact shape of the curved vanes formed by the pleats of the filter element on a reliable and repetitive basis.

This is made even more difficult due to the fact that the vanes described in the above-mentioned document are made quite rigid because of radial embossing in the filter paper.

OBJECTS AND SUMMARY OF THE INVENTION

The objective of this invention is to alleviate these disadvantages in particular.

To this end, the invention proposes a filter cartridge of the type in question, in which the first and second portions of each vane has hinge lines which are not stiffened by the separator elements and which extend parallel with the central axis of the filter element between the two longitudinal ends of said filter element, said hinge lines sub-dividing each first and second portion of the vanes into at least three panels each having separator elements, and the adjacent panels joined to one another by one of said hinge lines form angles of between 110 and 175 degrees.

As a result of these axial lines forming hinges, the curved shape of the vanes formed by the pleats in the filter element can be better controlled so that the process of manufacturing the filter in made easier and more reliable.

In preferred embodiments of the invention, one and/or other of the following features may be incorporated:

the porous sheet of the filter element has embossments extending along lines perpendicular to the longitudinal axis of said filter element which separate the first and second portions of the different vanes from one another, said embossments being broken by straight compression lines which are adapted not to cause any deterioration in the porous sheet and which form said hinge lines;

the porous sheet has substantially a same thickness at said compression lines and outside said compression lines;

said compression lines are lightly imprinted on the concave face of each first and second portion of the vanes;

the porous sheet of the filter element has stamped embossments which separate the lower faces and the upper faces of the different vanes from one another, said porous sheet having smooth axial strips with no embossing, said axial strips forming said hinge lines;

the porous sheet of the filter element has built-up separator elements which keep the first and second portions of the different vanes apart from one another, said porous sheet having smooth axial strips with no separator element, said axial strips forming said hinge lines;

the built-up separator elements are lines of glue;

the panels bounded by the hinge lines are substantially flat;

the panels. bounded by the hinge lines have a constant or increasing width from one panel to the next, in a radially outward direction;

the second portion of a vane is in contact, through said separator elements, with both the first portion of the same vane and the first portion of an adjacent vane, each adjacent first and second portions thereby delimiting a free space therebetween which forms a substantially constant cross-section between said adjacent first and second portions from the inner end to the outer end thereof, all the lower faces and upper faces oft he filter elements having a substantially identical form and the outer ends of the first and second portions of a same vane being joined to one another by an end face extending substantially parallel with the external cylindrical surface of the filter element;

each second portion of a vane is separate from an adjacent first portion:

by a first curvilinear distance 1 along the internal cylindrical surface of the filter element in a radial plane, which internal cylindrical surface has a first diameter d, and by a second curvilinear distance L along the external cylindrical surface in said radial plane, which external cylindrical surface has a second diameter D, the ratio l/L between said first and second distances being substantially equal to the ratio d/D between said first and second diameters;

the end face of each vane of the filter element has a substantially straight cross-section, said end face being joined to the lower face and the upper face of the vane by two axial folds.

BRIEF DESCRIPTION OF THE DRAWINGS

Other features and advantages of the invention will become clear from the following description of several of its embodiments, given by way of example and not restrictive in any respect, and with reference to the appended drawings.

Of the drawings.

DETAILED DESCRIPTION OF THE INVENTION

Figure 1:
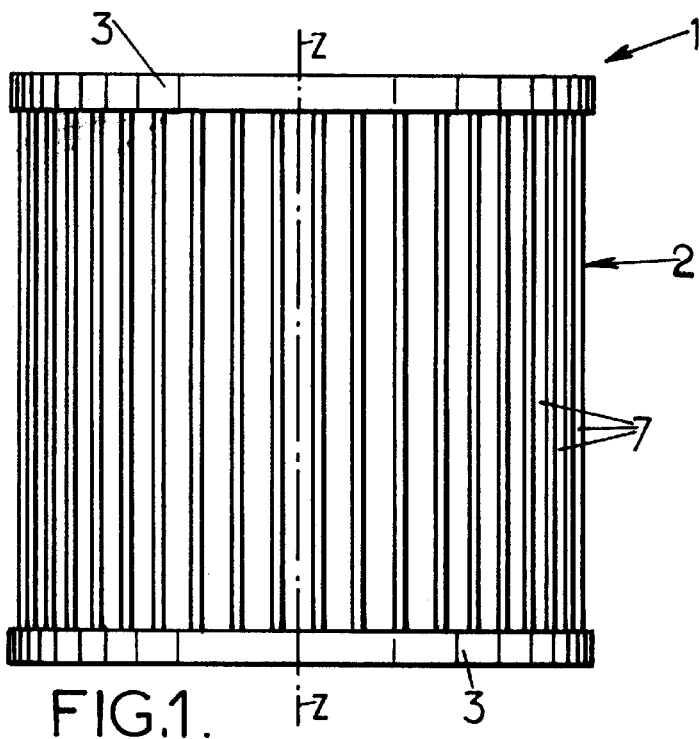
FIG. 1 is a side view of a first embodiment of a filter cartridge proposed by the invention.

The same reference numbers are used to denote the same or similar elements in the drawings.

Figure 2:
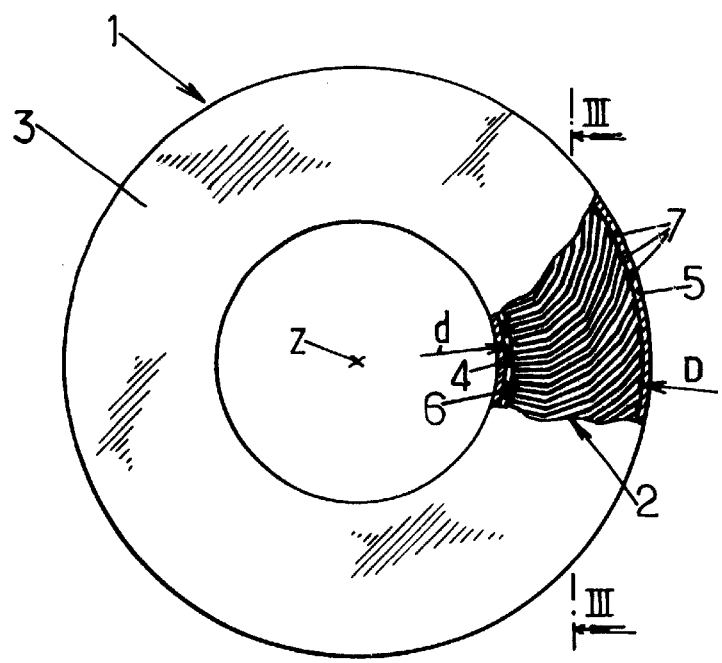
FIG. 2 is a cut-away plan view of the filter cartridge illustrated in FIG. 1.

FIGS. 1 and 2 illustrate a filter cartridge 1 which may be used to filter lubricating oil in an internal combustion engine, for example, or alternatively the liquid fuel or air with which such an engine is charged.

This filter cartridge comprises:

a tubular filter element 2, which describes a revolution about a central axis Z and extends axially between two longitudinal ends, this filter element being made from a pleated, flexible porous sheet, for example of paper, two end plates 3, provided in the form of metal annular crowns for example, which cap the two longitudinal ends of the filter element respectively, being joined to theme ends to form a seal, in particular by bonding, each plate 3 extending radially between an inner edge 4 (see FIG. 2) and an outer edge 5, the outer edges 5 of the two plates thereby trapping the filter element 2 and defining its external cylindrical surface, and, optionally, a rigid, perforated inner tube 6 (see FIG. 2) which is centered on the axis Z and at the ends of which the inner edges 4 of the plates are nested, this perforated tube forming a central passage for the filtered fluid and defining the internal surface of the filter element 2.

The perforated tube 6 could optionally be omitted, in which case the filter element 2 could be provisionally disposed around a tube or similar when manufacturing the filter cartridge, after which this tube would be removed.

Figure 4:
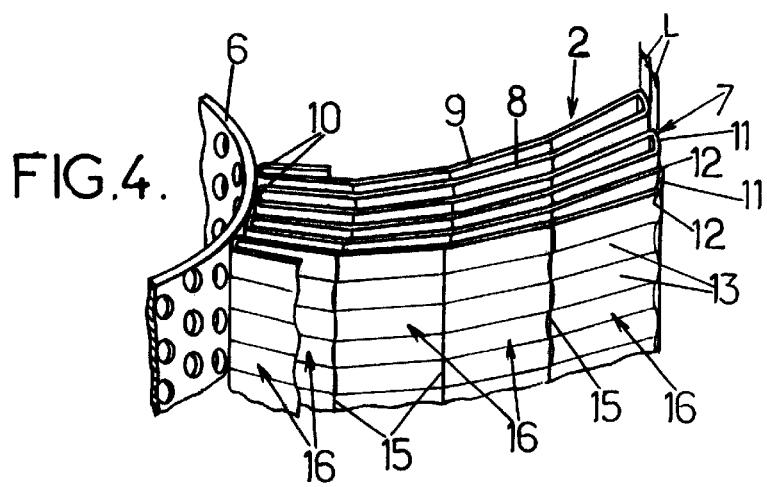
FIG. 4 is a partial perspective view of the filter element of the cartridge illustrated in FIGS. 1 to 3, and FIGS. 5 and 6 are views similar to that of FIG. 4, showing two different embodiments of the invention.

As illustrated in FIGS. 2 and 4, the filter paper 2 forms an angular succession of pleats 7 with axial edges assuming the form of vanes, all curved in a same angular direction when viewed in section in a radial plane.

Each of these pleats 7 in the form of curved vanes comprises first and second portions of the sheet of filter paper, referred to respectively as the upper face 8 and lower face 9, each having a concave face and a convex face.

These lower faces and upper faces are all identical within a same vane 7 and from one vane to the next (same shape and same length viewed in section in the radial plane).

The lower face and upper face of two adjacent vanes 7 a rejoined on a level with their inner ends by a single fold 10 positioned so as to be in contact with the perforated tube 6.

Furthermore, the radially outer ends of the upper face 8 and lower face 9 of each vane 7 are joined to one another by an end face 11 extending substantially parallel with the external cylindrical surface of the filter element.

In the example illustrated in FIGS. 2 and 4, the end face 11 of each vane is joined at the upper face 8 and at the lower face 9 of this vane by two folds 12 forming axial edges so that said end face 11 has a substantially straight section in any radial plane. Consequently, the end faces 11 of the different vanes more or less conform to the contour of the external cylindrical surface of the filter element 2.

However, it would also be possible for the end faces 11 of the vanes to be of different shapes and in particular to have angular or rounded shapes (in radial section), preferably substantially conforming to the contour of the external cylindrical surface of the filter element 2.

Figure 3:
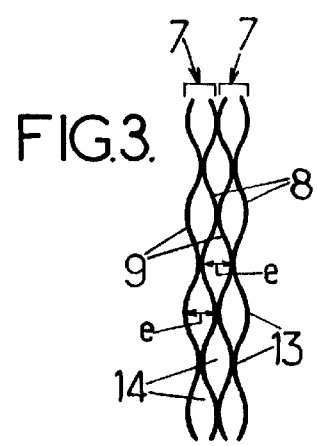
FIG. 3 is a view in partial section along the line 111—111 of FIG. 2.

Moreover, the filter paper 2 is embossed so as to form alternating corrugations, each located in a radial plane as illustrated in FIGS. 3 and 4.

When the filter paper is folded, these embossments 13 come into contact with one another, delimiting a plurality of passages 14 between them, each of which is also contained in a radial plane.

It should be pointed out that because of the embossments 13 and the passages 14, the inner folds 10 are relatively rounded in shape.

In accordance with the invention, the space e left between each upper face 9 and each lower face 8, on a level with the passages 14, is guaranteed to remain substantially constant from the inner ends of these upper faces and lower faces out to the outer ends of said upper faces and lower faces.

By "substantially constant space" is meant a space which will not increase in size towards the exterior of the filter element, this space being substantially the same in the vicinity of the inner and outer ends of the upper faces and lower faces.

In other words, the lower faces and upper faces of each vane 7 are in reciprocal contact by means of their embossments 13 and define a free space between them having a substantially constant passage section from the internal cylindrical surface out as far as the external cylindrical surface of the filter element and the vanes 7 are themselves in reciprocal contact by means of the embossments 13, a free space being left between them having a substantially constant passage section from the internal cylindrical surface out to the external cylindrical surface of the filter element.

The value of the space e between two vanes 7 may optionally be different from the value of the space e between the lower face and the upper face of a same vane.

However, in preferred embodiments, the space e is the same between all the lower faces and upper faces. This space is preferably less than twice the thickness of the filter paper, which thickness is generally less than 1 mm in the most commonly used instances.

For example, the space e may be in the order of 0.6 to 0.8 mm and the filter paper may be 0.4 to 0.6 mm thick.

In order to produce a substantially constant space between the different upper faces and lower faces, it is necessary that:

the different upper faces and lower faces all have a same curvilinear length, in a radial plane, substantially equal to $(D^2+d^2)/4d$, where D and d are the external and internal diameters of the filter element 2 respectively, and that the vanes 7 follow quite specific curved lines, which means laying the different vanes 7 in a relatively pronounced manner relative to the radial direction.

More specifically, the curved lines followed by the lower faces and upper faces of the vanes are such that at any point of these lower faces and upper faces located on a circle with a diameter x centered on the axis Z, the relationship is as follows:

$$\sin a = d/x,$$

where:

a is the angle subtended by the respective tangents between the above-mentioned circle and the lower face or upper face considered for the point considered, this angle being measured in a radial plane, and d is the internal diameter of the filter element 2.

In order to obtain this specific shape of the vanes 7, lines 15 of least resistance (see FIG. 4), that is to say hinge lines, are provided in the lower face and upper face of each vane, each extending parallel with the axis Z between the two longitudinal ends of the filter cartridge.

These lines 15 of least resistance are advantageously provided in the form of compression lines lightly imprinted in the porous sheet of the filter element, which compression lines are formed on the concave faces oft he upper faces and lower faces in order to initiate the curvature oft he vanes 7.

The compression lines in question serve solely to break or neutralize the embossments so that the lines 15 of least resistance are straight, enabling them to fulfill their role as hinges.

However, said compression lines cause virtually no deterioration in the filter paper, nor do they essentially induce any irreversible crushing in this filter paper, unlike the fold lines 10, 12.

For example, prior to folding, the thickness oft he filter paper on a level with the lines of least resistance may be between 70 and 100% of the normal thickness of said filter paper, for example, so as reduce the filtering capacity of the paper on a level with the lines 15 as little as possible.

There are at least two lines 15 of least resistance and there may be three, for example, on a level with each upper face and lower face, thereby delimiting in each upper face and lower face at least three axial panels 16 (four panels in the example illustrated in the drawings).

These panels 16 may be substantially flat and subtend between them an angle ranging between 110 and 175° F. or example, measured in a radial plane, on a level with the lines 15 of least resistance.

The width of the different panels 16 is constant, or optionally increases, from one panel to the next in a radial direction towards the exterior on each lower face and upper face.

Furthermore, the width of the end faces 11 of the vanes is selected so that the curvilinear distance L between the upper face 8 and the lower face 9 of the vane, measured along the external cylindrical surface of the filter element, is such that $L/l = D/d$, where:

l is the curvilinear distance between the upper face 8 and the lower face 9 of the vane, measured along the internal cylindrical surface of the filter element in the radial plane mentioned above, and d and D are the internal and external diameters of the filter element 2 respectively.

The same curvilinear distances l and L are also to be found between the upper face 8 and the lower face 9 belonging to two different vanes 7, unless, of course, the spaces e mentioned above differ on the inner side and the outer side of the vanes (in which case the curvilinear distances l' et L' between two vanes will be such that $L'/l'=D/d$).

Figure 5:
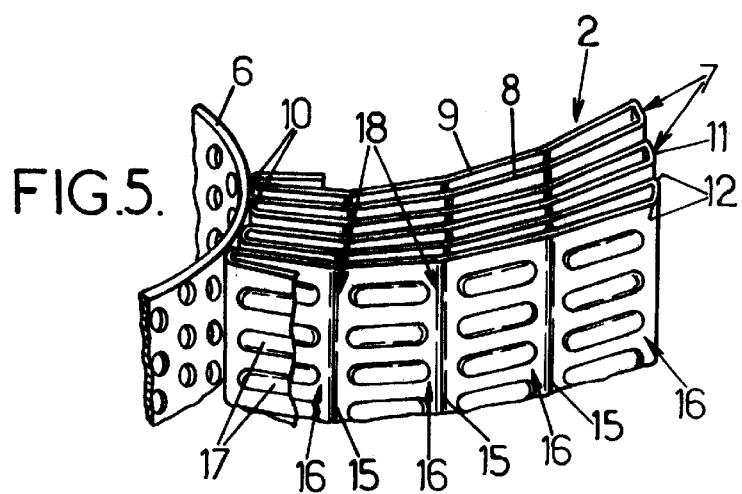

In a different embodiment, as illustrated in FIG. 5, the embossments 13 of the filter paper could be replaced by stamped bosses 17 projecting on one face and on the other face of the filter paper in alternation and disposed along lines perpendicular to the axis Z so as to come locally into reciprocal contact when the filter element is folded, in order to separate the different upper faces and lower faces oft he filter element 2 from one another, delimiting free spaces of a substantially constant width as in the example described above (however, the free spaces no longer have the shape of passages).

The boss lines are interrupted, leaving smooth axial strips 18 in the filter paper devoid of bosses, which axial strips constitute the lines 15 of least resistance mentioned above and form hinges between the different panels 16, as described above.

Figure 6:
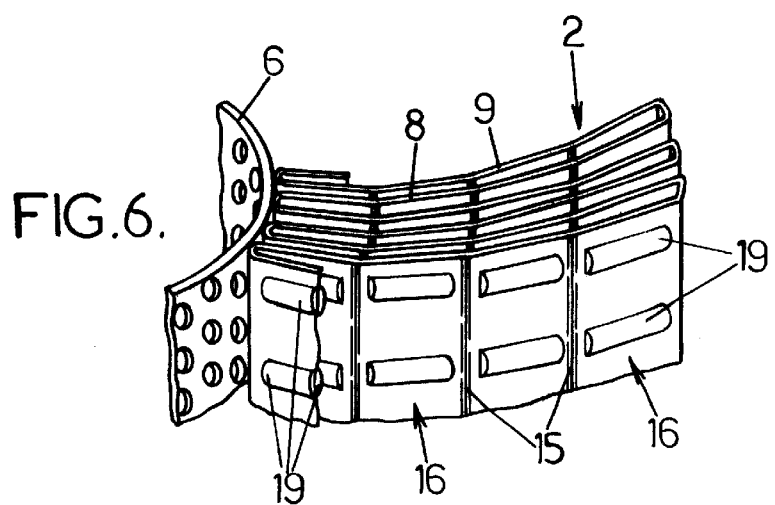

In another variant, illustrated in FIG. 6, the bosses 17 could be replaced by lines of glue 19 deposited on the two faces of the filter paper.

By preference, the lines of glue 19 deposited on the two sheets of filter paper are laid out so as to match one another in order to minimize the surface area of paper neutralized in this way.

As with the embodiment illustrated in FIG. 5, the lines 19 of glue are interrupted locally to provide smooth axial strips 18 in the filter paper on which no glue is provided, thereby defining the above-mentioned lines 15 of least resistance, delimiting between them the panels 16 of the upper faces and lower faces.

I claim:

1. Filter cartridge comprising a tubular filter element extending along a central axis between two longitudinal ends, said filter element having an external cylindrical surface and an internal cylindrical surface forming a central passage for fluid, said filter element being made from a porous, flexible sheet forming a succession of pleats with axial ridges, these pleats forming vanes all curved in a same angular direction, each vane comprising first and second portions each having a concave face and a convex face, each of said first and second portions of each vane extending between an inner end close to the internal cylindrical surface of the filter cartridge and an outer end close to the external cylindrical surface of the filter cartridge, the concave face of the first portion of each vane communicating with the central passage and the convex face of the second portion of each vane communicating with said central passage, the first and second portions of each vane being joined at their outer ends, the second portion of each vane being joined to the first portion of an adjacent vane at their inner ends, and the porous sheet having separator elements which keep the first and second portions of the vanes spaced apart from one another and which stiffen said porous sheet, wherein the first and second portions of each vane have hinge lines which are not stiffened by the separator elements and which extend parallel with the central axis of the filter element between the two longitudinal ends of said filter element, said hinge lines sub-dividing each first and second portion into at least three panels each having separator elements, and the adjacent panels of each vane which are joined to one another by one of said hinge lines form angles ranging between 110 and 175 degrees.

2. Filter cartridge as claimed in claim 1, in which the porous sheet of the filter element has embossments extending along lines perpendicular to the longitudinal axis of said filter element and which separate the first and second portions of the different vanes from one another, said embossments being broken by straight compression lines which are adapted not to cause any deterioration in the porous sheet which form said hinge lines.

3. Filter cartridge as claimed in claim 2, in which the porous sheet has substantially a same thickness at said compression lines and outside said compression lines.

4. Filter cartridge as claimed in claim 2, in which said compression lines are lightly imprinted on the concave face of each first and second portion of the vanes.

5. Filter cartridge as claimed in claim 1, in which the porous sheet of the filter element has stamped bosses which separate the lower faces and the upper faces of the different vanes from one another, said porous sheet having smooth axial strips devoid of bosses and said axial strips constituting said hinge lines.

6. Filter cartridge as claimed in claim 1, in which the porous sheet of the filter element has built-up separator elements which keep the first and second portions of the different vanes spaced apart from one another, said porous sheet having smooth axial strips devoid of separator elements, said axial strips constituting said hinge lines.

7. Filter cartridge as claimed in claim 6, in which the built-up separator elements are lines of glue.

8. Filter cartridge as claimed in claim 1, in which the panels delimited by the hinge lines are substantially flat.

9. Filter cartridge as claimed in claim 1, in which the panels delimited by the hinge lines have a constant or increasing width from one panel to the next in a radially outward direction.

10. Filter cartridge as claimed in claim 1, in which each second portion of a vane is in contact, through the separator elements, both with the first portion of the same vane and with the first portion of an adjacent vane, each adjacent first and second portion thereby delimiting a free space therebetween which provides a substantially constant cross-section between said adjacent first and second portions of the vanes from the inner end to the outer end thereof, all the first and second portions of the vanes of the filter element having a substantially identical form, and the outer ends of the first and second portions of a same vane being joined to one another by an end face extending substantially parallel to the external cylindrical surface of the filter element.

11. Filter cartridge as claimed in claim 10, in which each second portion of a vane is separated from an adjacent first portion:

by a first curvilinear distance l along the internal cylindrical surface of the filter element in a radial plane, which internal cylindrical surface has a first diameter d, and by a second curvilinear distance L along the external cylindrical surface in said radial plane, which external cylindrical surface has a second diameter D, the ratio l/L between said first and second curvilinear distances being substantially equal to the ratio d/D between said first and second diameters.

12. Filter cartridge as claimed in claim 10, in which the end face of each vane of the filter element has a substantially straight cross-section, said end face being joined to the first and second portions of the vane by two axial folds.

* * * * *